Jan. 22, 1924.
W. ROSSBERGER
AQUARIUM
Filed April 26, 1923
1,481,435
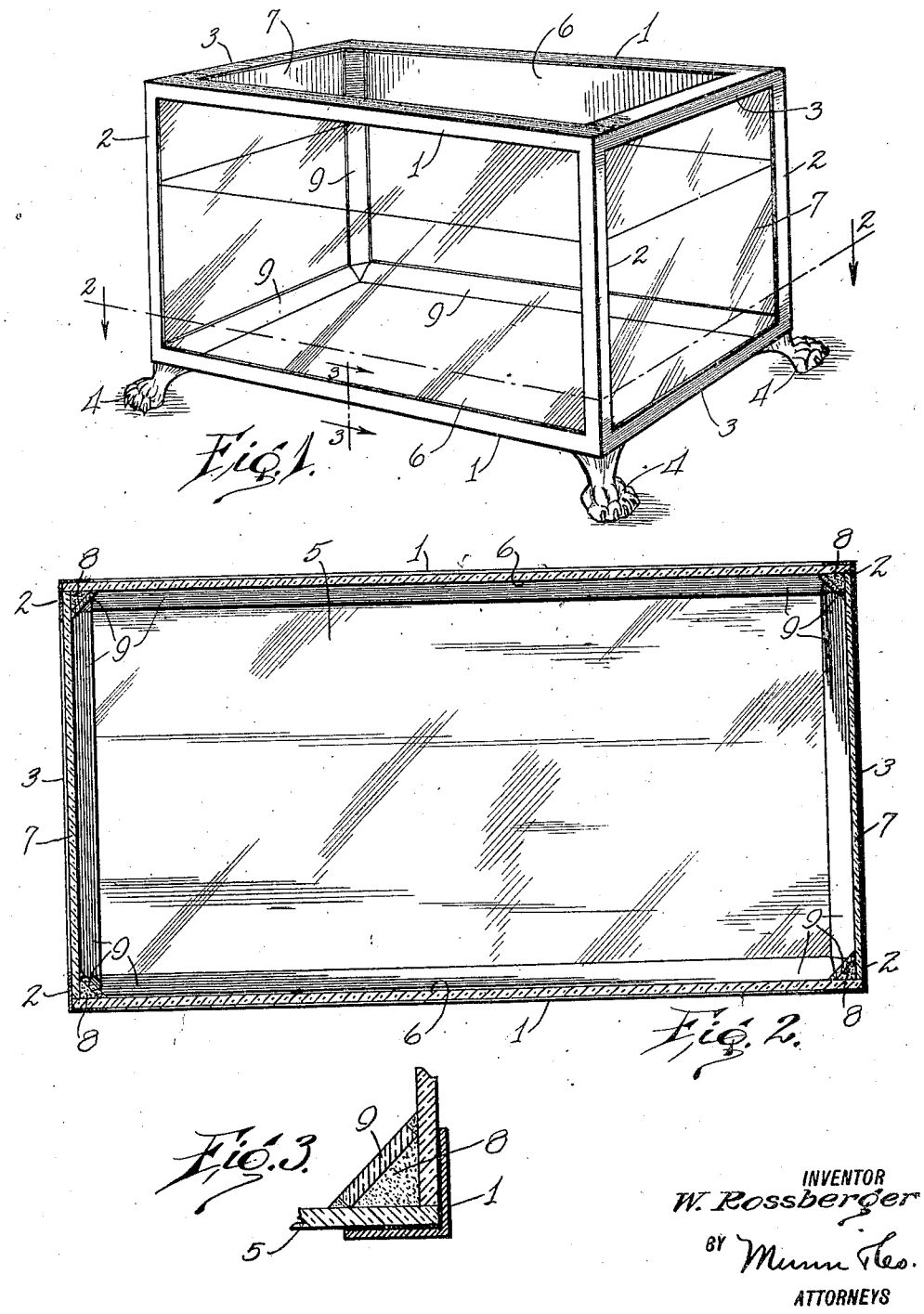
INVENTOR
W. Rossberger
BY Munn & Co.
ATTORNEYS Patented Jan. 22, 1924.

1,481,435

UNITED STATES PATENT OFFICE.

WILLIAM ROSSBERGER, OF WILMETTE, ILLINOIS.

AQUARIUM.

Application filed April 26, 1923. Serial No. 634,836.

*To all whom it may concern:*

Be it known that I, WILLIAM ROSSBERGER, a citizen of the United States, and a resident of Wilmette, in the county of Cook and State of Illinois, have invented a new and useful Improvement in Aquariums, of which the following is a full, clear, and exact description.

My invention relates to improvements in aquariums, and it consists in the combinations, constructions, and arrangements herein described and claimed.

An object of my invention is to provide an aquarium which is leak-proof.

A further object of my invention is to provide a leak-proof aquarium which has no metal on the interior of the same thus obviating the danger of injury to the fish such as would occur where heads of bolts or screws project into the interior.

A further object of my invention is to provide a means for rendering the joints of aquariums leak-proof, this means acting as a reenforcement or brace to the joints, and at the same time forming a comparatively smooth surface devoid of metal which might contaminate the water.

Other objects and advantages will appear in the following specification, and the novel features of the invention will be particularly pointed out in the appended claims.

My invention is illustrated in the accompanying drawings forming part of this application, in which—

Figure 1 is a perspective view of the device,

Figure 2 is a section along the line 2—2 of Figure 1, and

Figure 3 is an enlarged section of a portion of the line 3—3 of Figure 1.

In carrying out my invention, I make use of a metal frame consisting of the longitudinal members 1, the vertical members 2, and the transverse members 3. These frame members are preferably L-shaped in cross section similar to angle irons used in building construction, being of course, much smaller. The frame members are secured together at their ends in any suitable manner, but preferably by welding or soldering. In order to protect the frame from rust, I may galvanize it or give it a protective coating such as paint, enamel, or other suitable covering. The frame is mounted on legs 4 and is preferably of the shape shown in the drawings. The bottom, sides, and ends are of glass. In constructing the aquarium I first place a thin layer of cement or putty on the inwardly projecting edges of the bottom frame members. I then insert the bottom from above. This is done by turning the bottom plate diagonally with respect to the frame, lowering it into the frame, and then turning it into a horizontal position and lowering it so that it will rest on the inturned portion of the bottom frame members as shown in Figure 3. When the bottom plate 5 is in position, the side plates 6 are placed in position so as to rest on the bottom plate. The end plates 7 are then placed in position, thus forcing the side plates closely against the vertical frame members 2 so as to make a tight fit all around.

When the glass plates are in position, waterproof putty or plastic cement 8 is filled in along the contacting edges of the sides, bottom, and end plates, and then glass strips 9 extending substantially the full length of the contiguous edges of the sides, ends, and bottom plate are placed over the putty and forced toward the corners until the edges of the strips 9 engage the contacting plates. In Figure 3 it will be seen that the strip 9 is placed diagonally so as to form a brace between the bottom plate 5 and the side plate 6. Similar plates 9 are provided at the corners, as shown in Figure 2. In finishing the job, sufficient of the cement or putty is worked into the spaces between the sides of the strips and their adjacent glass plates so as to fill up these crevices.

An aquarium constructed according to the present invention has several distinct advantages over the ordinary aquarium. In certain aquariums, the joints are held together by means of screws or bolts, the ends of which project into the aquarium. This tends to cause the rusting of the screws and to contaminate the water containing the fish. In the present device, there are no such screws or bolts, and, of course, no such contamination. In certain aquariums where the joints are puttied or cemented, the putty tends to dry out, especially above the water line. It will then crack, and the glass plates will become loose, permitting leakage. One of the main features of my invention is the fact that the putty or cement is covered by the plate 9 and does not dry out. Furthermore, the plates 9 tend to form bracing members at every joint where a slight movement will occasion the leakage of the aquarium. Children are very apt to press against the glass, and the strip 9, aside from forming a protecting means for keeping the putty from drying out, forms a brace, and thus prevents movement which might tend to result in leakage. It will be observed from Figure 3 that any leakage, for instance, downwardly, would only occur where the water passes around the plate 9, past the putty 8, through the joint between the bottom 5 and the sides 6, around the end plate 5, and inwardly past the putty layer upon which the plate 5 rests. This is very unlikely to occur because the putty itself when kept in good condition would prevent it.

The aquarium thus constructed is braced at the bottom edges, and at the corners, so that the structure is rigid.

I claim:

1. In an aquarium construction, a glass bottom plate, glass side and end plates resting on said bottom plate, a plastic covering for the joints at the contiguous edges of said plates, and means for protecting the plastic covering from drying out.

2. In an aquarium construction, a glass bottom plate, glass side and end plates supported upon said bottom plate, a plastic covering for the joints between the contiguous edges of said plates, and a glass strip extending substantially the length of each joint for preventing the drying out of the plastic covering.

3. In an aquarium construction, a glass bottom plate, glass side and end plates supported upon said bottom plate, a plastic covering for the joints between the contiguous edges of said plates, said plastic covering being of triangular cross section, and a glass strip extending substantially the length of each joint between adjacent plates, the edges of the glass strip being in contact with the adjacent plates, whereby the plastic material is prevented from drying out and the contiguous plates are braced.

4. In an aquarium construction, a metal frame having longitudinal, vertical, and horizontal portions, each of said portions comprising an L-shaped member, a glass bottom arranged to rest on the inwardly extending portions of certain of said frame members, glass sides and ends arranged to rest on the glass bottom, the sides being spaced apart by the ends, a plastic coating of triangular cross section at each inner corner formed by the contiguous plates, and glass strips covering the plastic material, the edges of each of the glass strips contacting with and forming a brace for the contiguous glass plates.

WILLIAM ROSSBERGER.